(12) United States Patent
Talbott (10) Patent No.: US 6,435,801 B2
(45) Date of Patent: Aug. 20, 2002

(54) PIVOTAL HITCH-MOUNTED HAULER

(76) Inventor: Teddy D. Talbott, 2301 Pawnee Rd., Garden City, KS (US) 67846

( * ) Notice: Subject to any disclaimer, the term of this patent is extended or adjusted under 35 U.S.C. 154(b) by 0 days.

(21) Appl. No.: 09/790,730

(22) Filed: Feb. 22, 2001

Related U.S. Application Data (60) Provisional application No. 60/162,421, filed on Feb. 22, 2000.

(51) Int. Cl.$^7$ .................................................. B60P 9/00
(52) U.S. Cl. ....................................... 414/462; 224/521
(58) Field of Search ................................ 414/462, 559, 414/551, 554, 680, 501, 546; 224/521, 519, 402, 404

(56) References Cited

U.S. PATENT DOCUMENTS

| | | | |
|---|---|---|---|
| 4,036,378 A | * | 7/1977 | Luukonen et al. .......... 414/559 |
| 4,861,224 A | * | 8/1989 | Holmes ...................... 414/680 |
| 5,529,453 A | * | 6/1996 | La Gois et al. ............. 414/462 |
| 6,109,855 A | * | 8/2000 | Vela-Cuella ................. 414/462 |

FOREIGN PATENT DOCUMENTS

FR 002620664 A1 * 3/1989 ................. 414/546

* cited by examiner

*Primary Examiner*—Kathy Matecki
*Assistant Examiner*—Sang Kim
(74) *Attorney, Agent, or Firm*—Hovey Williams LLP

(57) ABSTRACT

A hauler (10) for hauling cargo behind a vehicle (V) and configured to mount on a hitch (H) is disclosed. The hauler (10) includes a base (12), a frame (14) pivotally mounted the base (12), and a basket (16) rotatably supported on the frame (14). The frame (14) is pivoted between loading and transport positions by a winch assembly (122). The winch assembly (122) is also operable to winch cargo into the basket (16), hoist cargo relative to the frame (14), and couple to and uncouple from hoisting and winching implements (156,158). The basket (16) is rotatable substantially 360 degrees relative to the frame (14) and can maintain indexed positions of rotation.

18 Claims, 4 Drawing Sheets

PIVOTAL HITCH-MOUNTED HAULER

RELATED APPLICATION

This application claims the benefit of U.S. Provisional Application No. 60/162,421 filed Feb. 22, 2000 and entitled TALBOTT PACKMASTER hereby incorporated into the present application by reference.

BACKGROUND OF THE INVENTION

1. Field of the Invention

The present invention relates generally to equipment for hauling cargo behind a vehicle. More specifically, the present invention relates to a hauler for mounting to the hitch of a passenger vehicle and pivotable between a loading position and a transport position.

2. Discussion of Prior Art

It is often desirable to haul certain kinds of cargo behind a passenger vehicle, particularly where the inside of the vehicle is not well suited for hauling the cargo (e.g., hauling a deer carcass, firewood, oversized furniture, etc., in a sedan or sport utility vehicle). The cargo is often difficult to load (e.g., heavy) and it is desirable for the hauler to facilitate both the loading of the cargo and stowing the cargo for transport. It is also desirable for the hauler to be easily removable from the vehicle, as well as allow access to the rear compartment of the vehicle while the hauler is attached (e.g., to facilitate loading cargo into a truck bed).

Prior art hauling devices include wheeled carts that are towed behind a vehicle or devices permanently affixed to the vehicle. These prior art devices present undesirable limitations. For example it is typically difficult to manually load heavy objects (e.g., a deer carcass) in these devices and such devices can impede access to the rear of the passenger vehicle.

SUMMARY OF THE INVENTION

The present invention provides an improved hauler that does not suffer from the problems and limitations of prior art hauling devices set forth above. The inventive hauler provides a hauler that mounts on the hitch (e.g., a receiver hitch) of a passenger vehicle for easy removal. The hauler is pivotable between loading and transport positions to facilitate the loading and hauling of cargo.

The hauler of the present invention broadly includes a base operable to mount on a hitch, a frame pivotally supported on the base, and a basket rotatably supported on the frame and being operable to haul cargo. The frame is pivotable between a loading position, wherein the basket is adjacent the ground and a transport position, wherein the basket is spaced from the ground and adjacent the rear of the vehicle. The basket is rotatable into a plurality of various, indexed, rotational positions relative to the frame.

The frame can be pivoted by a winch assembly. The winch assembly is also operable to hoist cargo relative to the frame, winch cargo into the basket, and couple to and uncouple from hoisting and winching implements. The frame includes a pair of telescoping gin poles operable to detachably receive hoisting implements.

In operation, the base may be mounted to a hitch of a passenger vehicle so that the frame and basket are supported behind the rear of the vehicle. The winch assembly may be operated to pivot the frame relative to the base into the loading position and the basket may be rotated into an open-throat position to facilitate the loading of cargo (e.g., a deer carcass). The cargo-loaded basket may then be rotated into an upright position and the frame may be pivoted into the transport position where it may be locked to facilitate the transport of the cargo.

Other aspects and advantages of the present invention will be apparent from the following detailed description of the preferred embodiment and the accompanying drawing figures.

BRIEF DESCRIPTION OF THE DRAWING FIGURES

A preferred embodiment of the invention is described in detail below with reference to the attached drawing figures, wherein.

DETAILED DESCRIPTION OF THE PREFERRED EMBODIMENTS

Figures 1, 2:
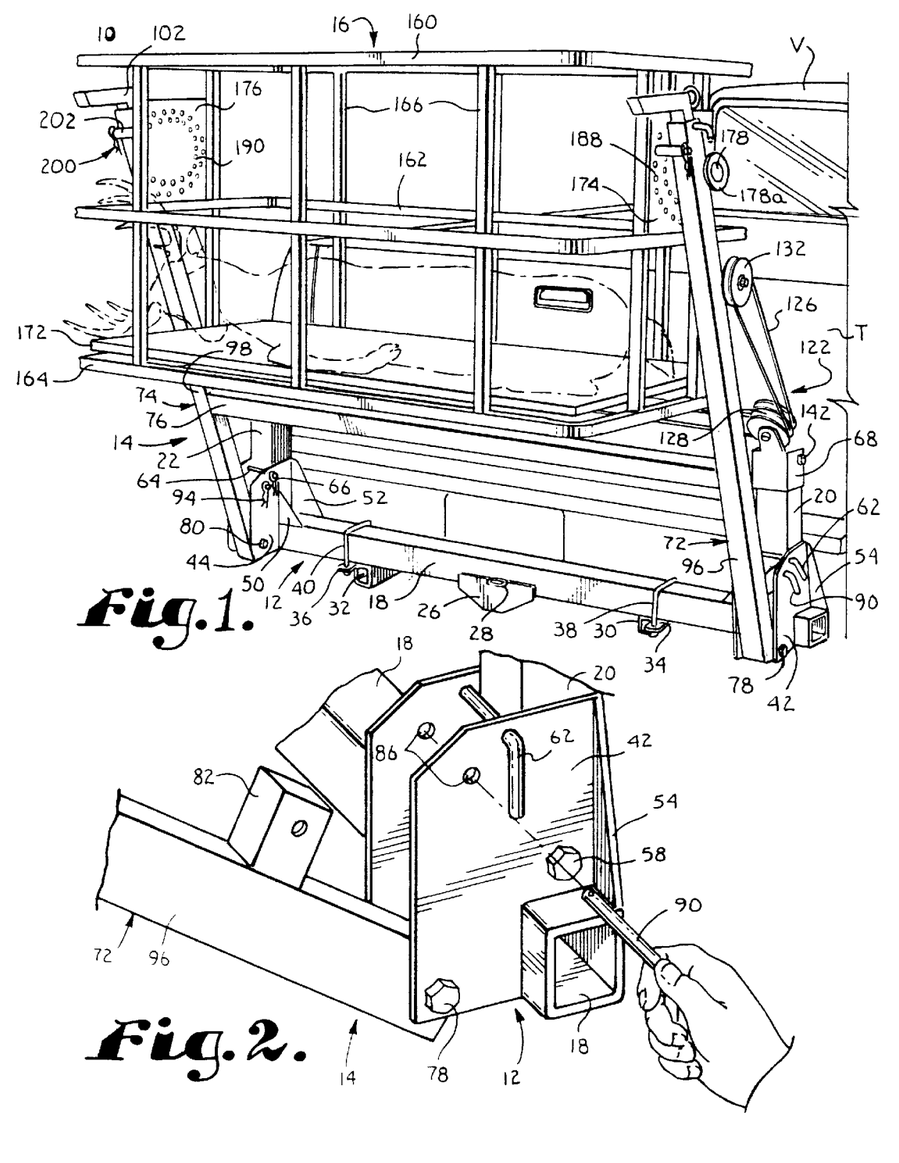
FIG. 1 is a perspective view of a hauler constructed in accordance with a preferred embodiment of the present invention and shown mounted on the hitch of a passenger vehicle.
FIG. 2 is an enlarged fragmentary perspective view of the hauler illustrating the frame locking mechanism in the unlocked position, wherein the frame is free to pivot toward the loading position.
Figure 3:
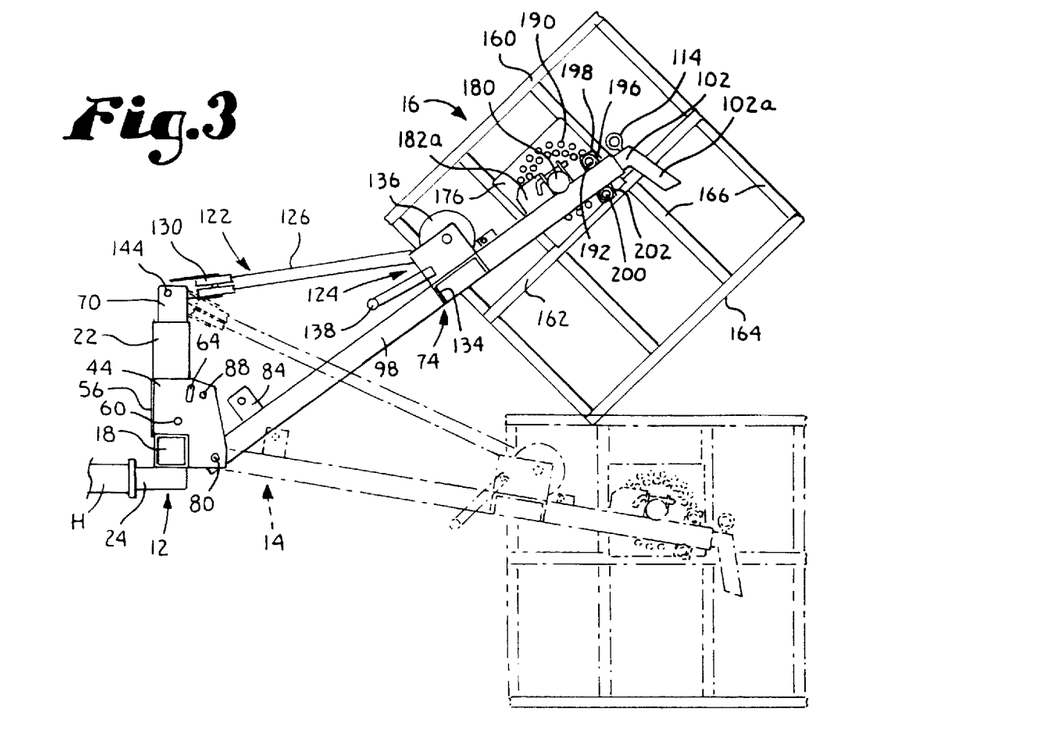
FIG. 3 is a side elevational view of the hauler shown mounted on a receiver hitch and illustrating the pivoting of the frame toward the loading position (shown in phantom lines)

FIG. 1 illustrates a hauler 10 constructed in accordance with a preferred embodiment of the present invention and configured to mount on a receiver hitch H (see FIG. 3) of a passenger vehicle V having a rear-entry tailgate T. The hauler 10 broadly includes a base 12, a frame 14 pivotally mounted to the base 12, and a basket 16 rotatably supported on the frame 14.

Turning initially to FIG. 1, the base 12 includes a horizontal support member 18 with a pair of lift towers 20,22, one coupled at each end of the member 18. The base 12 further includes a hitch member 24 (see FIG. 3) fixed to the bottom surface of the horizontal support member 18 generally at the center of the member 18 and configured to be received in a standard receiver hitch H (e.g., tubular shaped with a bore operable to receive a receiver pin). The hitch member 24 is gusseted to the horizontal support member 18 by a pair of gussets (not shown) and further supported by lug plate 26 having a chain link-shaped lug 28 fixed thereto. The base 12 preferably includes a pair of receiver tubes 30,32, each one fixed at one end to the receiver hitch H and extending therefrom so that the opposing end is adjacent the horizontal support member 18 (e.g., L-shaped). Fixed to the receiver tubes 30,32 are receiver tube supports 34,36, respectively. The receiver tube supports 34,36 are substantially flat and each includes a pair of U-bolt receiving apertures. The receiver tube supports 34,36 are configured to cooperate with the horizontal support member 18 to provide an aperture on either side of the support member 18. U-bolts 38,40 encircle the horizontal member 18 and are received in the corresponding apertures of the receiver tube supports 34,36, respectively. The U-bolts 38,40 cooperate with the hitch member 24 to secure the base 12 on the hitch H and provide for easy removal of the base 12 from the hitch H. It is within the ambit of the present invention to utilize a base configuration adapted to mount the base to other types of hitch arrangements (e.g., a ball-type hitch).

Figures 7, 8:
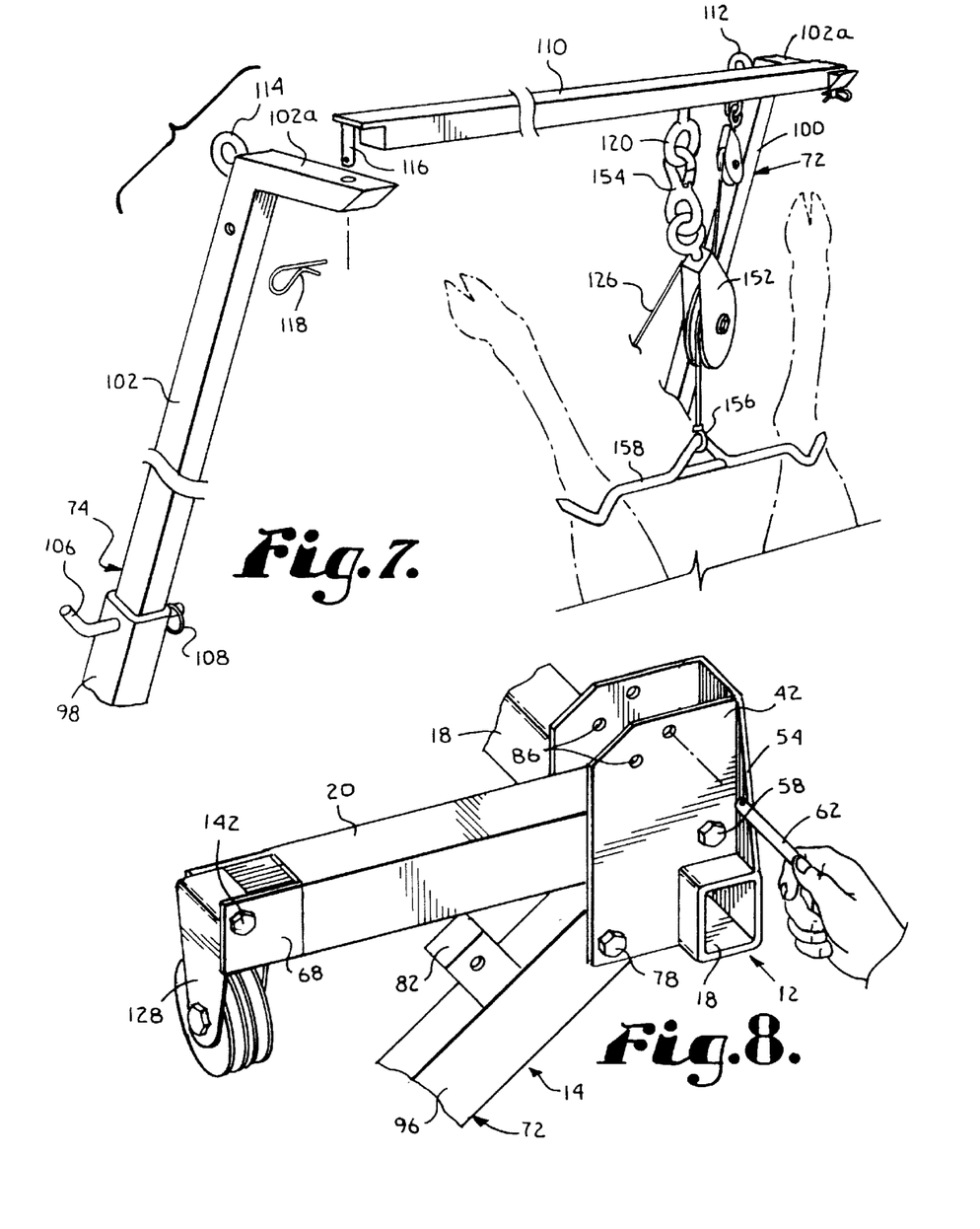
FIG. 7 is an enlarged fragmentary perspective view of the hauler illustrating the gin poles telescoped into the extended position having a hoisting implement detachably received thereon and hoisting cargo (shown in phantom lines)
FIG. 8 is an enlarged fragmentary perspective view of the hauler illustrating the base locking mechanism in the unlocked position and the base pivoted into the rear-access position.

The lift towers 20,22 are pivotally coupled to the horizontal support member 18 by bracket assemblies 42,44, respectively. The bracket assemblies 42,44 are fixed to the horizontal support member 18 and each is gusseted thereto by a corresponding pair of inner gussets 46,48 and 50,52, and a single outer gusset 54,56, respectively. The lift towers 20,22 are pivotally joined to the corresponding bracket assemblies 42,44 by base pivot pins 58,60. When the hauler 10 is in operation and the frame 14 and the basket 16 are in a raised transport position (as shown in FIG. I and described in detail below), the lift towers 20,22 are in an upright operating position as shown in FIG. 1, wherein the towers 20,22 extend vertically from and are generally perpendicular to the horizontal support member 18. The lift towers 20,22 are retained in the upright operating position by corresponding base locking pins 62,64 (see FIG. 2), each having a cooperating base cotter pin (only the base cotter pin 66 on the locking pin 64 being shown) that retain the locking pins 62,64 in place. When the frame 14 (and therefore the basket 16) are in a lowered loading position (as will subsequently be described), the lift towers 20,22 can be pivoted into a rear-access position by removing the base locking pins 62,64 and pivoting the towers 20,22 about the pivot pins 58,60 until the towers 20,22 extend substantially horizontally from the horizontal support member 18 as shown in FIG. 8. With the lift towers 20,22 in the rear-access position, the tailgate T of the vehicle V can be opened facilitating access to the rear compartment of the vehicle V. For purposes that will subsequently be described, fixed to the ends of each lift tower 20,22, opposite the pivot pin-having end, is a respective pulley-receiving bracket 68,70.

Figures 5, 6:
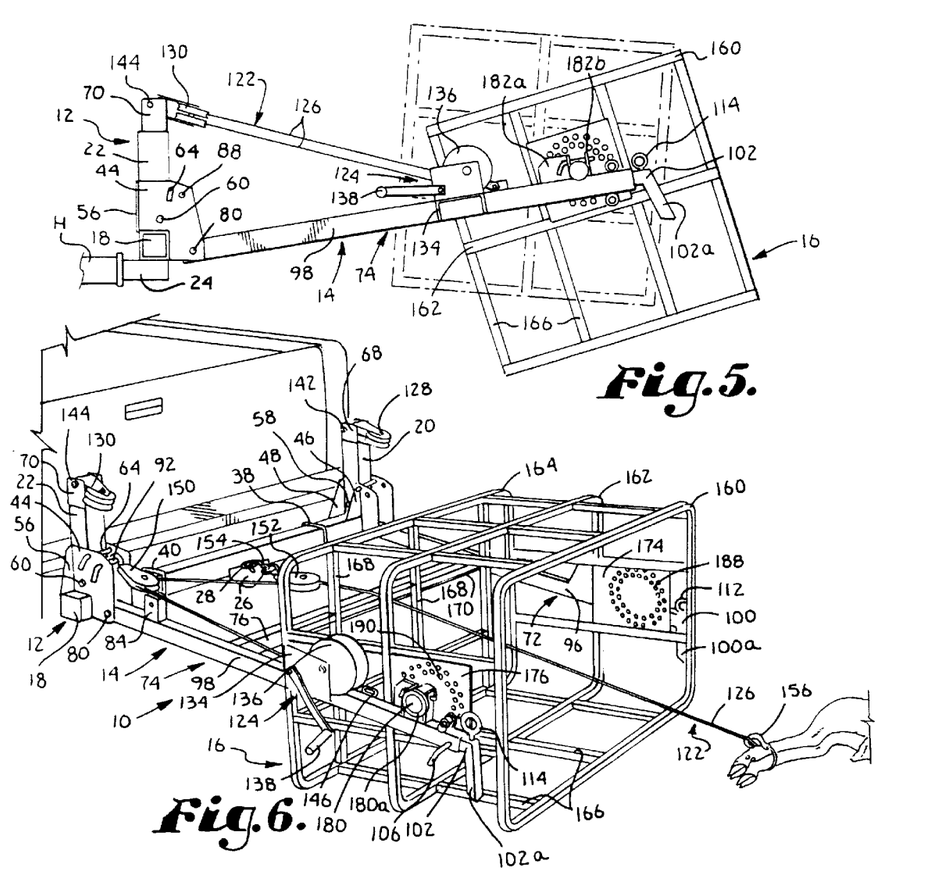
FIG. 5 is a side elevational view of the hauler shown mounted on a receiver hitch and illustrating the rotation of the basket with an intermediate rotational position shown in phantom lines.
FIG. 6 is a perspective view of the hauler shown mounted on the hitch of a passenger vehicle illustrating the winch assembly winching cargo into the basket when the basket is in the open-throat position and the frame is in the loading position.

The frame 14 is pivotally coupled to the base 12 by the bracket assemblies 42,44 and includes a pair of gin poles 72,74 laterally supported by a cross beam 76. Each of the gin poles 72,74 is pivotally joined to the corresponding bracket assembly 42,44 by a frame pivot pin 78,80. The frame 14 pivots between a raised transport position as shown in FIG. I and a lowered loading position as shown in FIG. 6. In the transport position, the frame 14 is generally upright relative to the rear of the vehicle V but sufficiently angled away there from to allow the attached basket 16 to clear the rear of the vehicle V so as not to be in contact therewith. In the loading position, the frame 14 is generally prone relative to the rear of the vehicle V and sufficiently pivoted out of the transport position so that the basket 16 is supported by the ground surface. The frame 14 is retained in the transport position by a locking mechanism including a pair of aperture-having blocks 82,84 fixed to the inside surfaces of the respective gin poles 72,74 adjacent the pivot pin-having ends. When the frame 14 is in the transport position, the apertures in the blocks 82,84 align with a set of corresponding apertures 86,88 in the bracket assemblies 42,44 so that frame locking pins 90,92 pass through the corresponding aperture set 86,88 and the aperture in the blocks 82,84 as shown in FIG. 2. The frame locking pins 90,92 are retained in position by frame lock cotter pins (only frame lock cotter pin 94 on the frame locking pin 92 being shown).

Each of the gin poles 72,74 includes a basket-supporting section 96,98 and an extension section 100,102 telescopically received within the basket-supporting section 96,98 (see FIG. 7). The basket-supporting sections 96,98 are hollow tubes for receiving the extension sections 100,102 and the extension sections 100,102 are preferably configured to be received within the basket-supporting sections 96,98 so that the extension sections 100,102 span substantially the entire distance between the open distal ends and the proximate pivot ends of the gin poles 72,74. The extension sections 100,102 telescope into an extended position as shown in FIG. 7, wherein the extension sections 100,102 are substantially extended out of the basket-supporting sections 96,98. The gin poles 72,74 include a locking mechanism for both selectively preventing the extension sections 100,102 from extending toward the extended position and to retain them in the extended position once extended thereto. Particularly, the basket-supporting sections 96,98 include apertures adjacent their distal ends that cooperate with apertures adjacent both the distal (for preventing the extension sections 100,102 from extending) and proximate ends (for retaining the extension sections 100,102 in the extended position) of the extension sections 100,102 to receive gin pole locking pins 104,106. The gin pole locking pins 104, 106 are retained in place by gin pole cotter pins (only the gin pole cotter pin 108 on the gin pole locking pin 106 being shown).

The extension sections 100,102 of the gin poles 72,74 are configured to detachably receive hoisting implements (e.g., a cross bar 110). Particularly, the distal ends of the extension sections 100,102 are L-shaped having end portions 100a, 102a that extend generally perpendicularly outward from the extension sections 100,102 (see FIG. 7). The end portions 100a,102a include pin-receiving apertures adjacent one end and eye hooks 112,114 fixed at the opposing end. The cross bar 110 has end portions that are recessed with attachment pins (only attachment pin 116 being shown) fixed thereto and configured to be received within the apertures in the end portions 100a,102a of the extension sections 100,102. Cross bar cotter pins (only cross bar cotter pin 118 being shown) retain the cross bar 110 in place when mounted on the gin poles 72,74. The cross bar 110 further includes a cross bar eye hook 120 fixed generally to the center of the cross bar 110.

A winch assembly 122 coupled to the frame 14 cooperates with the base 12 to pivot the frame 14 between the loading and transport positions. The winch assembly includes a ratchet unit 124, a cable 126, a pair of double pulley assemblies 128,130, and a single pulley assembly 132. The ratchet unit 124 is mounted to the basket-supporting section 98 of the gin pole 74 by a ratchet mount 134 (see FIG. 4). In one manner commonly known in the art, the ratchet unit 124 includes a rotatable toothed ratchet spool 136 driven by a manually cranked handle 138 cooperating with a cogged gear wheel 140 and a ratchet stop (not shown). A respective one of the double pulley assemblies 128,130 is pivotally mounted to a corresponding pulley-receiving bracket 68,70 on the lift towers 20,22 by pulley pins 142,144. The single pulley assembly 132 is mounted on the basket-supporting section 96 of the gin pole 72. The cable 126 is fixed at one end to the ratchet spool 136 and extends there from to entrain the top pulley of double pulley assembly 130, the top pulley of double pulley assembly 128, the single pulley assembly 132, the bottom pulley of double pulley assembly 128, and the bottom pulley of double pulley assembly 130. The opposing end of the cable 126 is coupled to a cable lug 146 fixed to the basket-supporting section 98 of the gin pole 74 by a double clevis hook 148 (see FIG. 4).

The frame 14 is pivoted between the loading and transport positions by cranking the handle 138. The handle 138 is cranked in a cable coiling direction wherein the cable 126 is coiled onto the ratchet spool 136 to pivot the frame 14 toward the transport position. The handle 138 is cranked in a cable uncoiling direction wherein the cable 126 is uncoiled from the ratchet spool 136 to pivot the frame 14 toward the loading position. The ratchet stop is configured to retain the gear wheel 140 (and thus the ratchet spool 136) at each cog—or index—on the gear wheel 140 thereby retaining the frame 14 in positions intermediate to the loading and transport positions (see FIG. 3). It is within the ambit of the present invention to utilize various alternative methods for pivoting the frame 14 relative to the base 12 (e.g., motor driven winches, power actuators, etc.).

In addition to pivoting the frame 14, the winch assembly 122 can winch cargo (e.g., a deer carcass) into the basket 16, for example when the frame 14 is in the loading position and the basket 16 is in the open-throat position (as will be further described below) as shown in FIG. 6. A first snatch block 150 is coupled to the frame locking pin 92 and a second snatch block 152 is coupled by a quick link 154 to the lug 28 on the lug plate 26. The cable 126 is disconnected from the double clevis hook 148 and unthreaded from the pulley assemblies 128,130,132. The disconnected end of the cable 126 is then threaded through the first and second snatch blocks 150,152 and through the basket 16 (see FIG. 6). The disconnected end of the cable 126 is then attached to a clevis slip hook 156. The cable 126 is coupled to the cargo and the handle 138 is cranked in the cable coiling direction to winch the cargo into the basket 16. These steps are reversed to return the hauler 10 to its standard operational configuration.

The winch assembly 122 is further operable to hoist cargo, (e.g., a deer carcass) and suspend it off of the ground (e.g., for skinning the deer carcass), for example when the frame 14 is in the transport position and the basket 16 is removed, as shown in FIG. 7. The frame 14 is pivoted to the loading position. The extension sections 100,102 are extended into the extended position and retained there by gin pole locking pins 104,106. The cross bar 110 is mounted to the end portions 100a,102a. The first snatch block 150 is coupled to the eye hook 112 and the second snatch block 152 is coupled by the quick link 154 to the cross bar eye hook 120. The cable 126 is disconnected from the double clevis hook 148 and unthreaded from the bottom pulleys of the assemblies 128,130. The disconnected end of the cable 126 is then threaded through the first and second snatch blocks 150,152 and attached to the clevis slip hook 156. The clevis slip hook 156 (and thus the cable 126) is threaded under the gin pole 74 and temporarily attached thereto (e.g., hooked to the gin pole locking pin 106). The handle 138 is then cranked in the cable coiling direction to pivot the frame 14 into the transport position where it is locked by the frame locking pins 90,92. The clevis slip hook 156 is then unhooked from the gin pole 74 and the handle 138 is cranked in the cable uncoiling direction until the clevis slip hook 156 is adjacent (or resting on) the ground surface. The clevis slip hook 156 is attached to a gambrel 158 (or other hoisting implement), which is then attached to the cargo. The handle 138 is cranked in the cable coiling direction to hoist the cargo to the desired height. These steps are reversed to return the hauler 10 to its standard operational configuration.

The basket 16 has a tubular lattice like framework construction of a generally rectangular shape open on the top—the throat section (see FIG. 6)—that is dimensioned to fit between the gin poles 72,74. The framework includes three spaced apart rectangular basket rings, a top ring 160, a middle ring 162, and a bottom ring 164. The rings 160,162,164 are adjoined by a plurality of side members 166 that support the rings 160,162,164 and maintain their spaced apart configuration. Fixed to the bottom ring 164 are intersecting lateral platform supports 168 and longitudinal platform supports 170 that are fixed together at the intersections thereof The platform supports 168,170 support a removable platform 172 dimensioned to fit between opposing side members 166. When the basket 16 is positioned generally throat section up (as shown in FIG. 1), the platform 172 can be inserted on the inside of the basket 16, supported on the platform supports 168,170, and used to support cargo. The platform supports 168,170 are inlayed relative to the bottom ring 164 to form a platform lip so that when the basket 16 is positioned throat section down (e.g., when the frame 14 is in the loading position and the basket 16 is rotated bottom ring up and the top ring 160 rests on the ground surface) the platform 172 fits in the lip and is supported by the platform supports 168,170. In this position, the basket 16 can be used as a workstation (e.g., to section out a deer carcass).

It is within the ambit of the present invention to utilize alternative basket designs suited for a variety of cargo hauling needs and features related thereto. For example, the basket could have a solid-wall construction (e.g., formed of plastic, nylon, etc.) or include a liner for hauling cargo requiring a nonporous structure, such as firewood. The basket could include an integrated seat and be camouflage colored so when removed, the basket could be used as a hunting blind. The basket could include a three sided configuration or a ramp feature for hauling cargo such as a powered wheelchair.

The basket 16 is rotatably mounted on the frame 14. Particularly, the basket 16 includes a pair of hub plates 174,176 fixed to the side members 166 and the middle basket ring 162 on the opposing ends of the basket 16. Each of the hub plates 174,176 includes a hub 178,180, respectively, extending generally from the center of the corresponding hub plate 174,176. Formed on the end of each of the hubs 178,180 opposite the hub plates 174,176 is a respective boss 178a,180a. The hubs 178,180 are received in hub brackets (only the hub bracket 182 for the hub 180 being shown) fixed to the basket-supporting sections 96,98 of the gin poles 72,74. The hub brackets are essentially identical and only the hub bracket 182 will be described in detail. The hub bracket 182 includes a distal section 182a and a proximate section 182b (see FIG. 4). The distal section 182a is L-shaped and is sufficiently spaced from the proximate section 182b so that the hub 180 rotatably fits between them but the boss 180a does not. The hub 180 is rotatably held in place by hub lock pin 184 having a corresponding hub cotter pin 186. The hub lock pin 184 is positioned into aligned apertures in each of the distal and proximate sections 182a,182b of the hub bracket 182. Removal of the hub lock pins provides for quick and easy detachment of the basket 16 from the frame 14.

Figure 4:
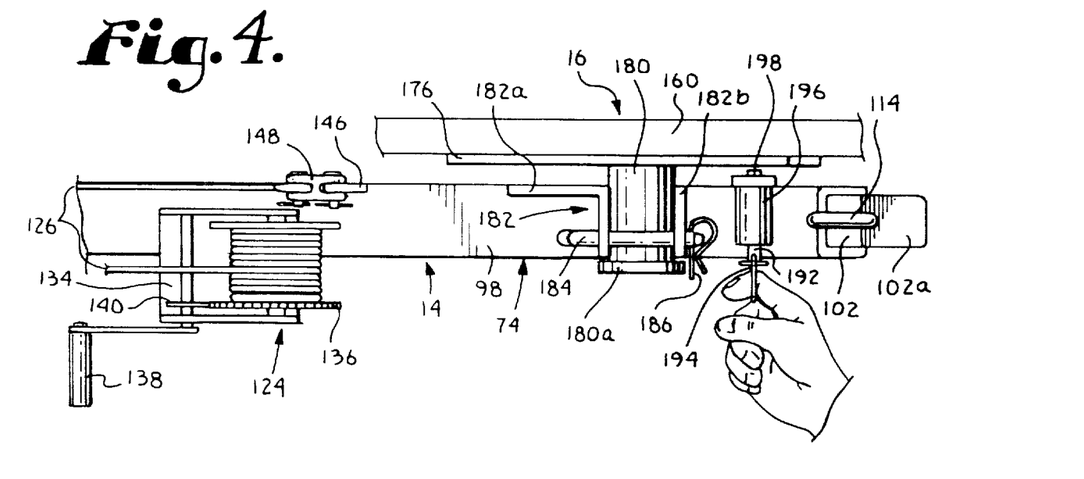
FIG. 4 is an enlarged fragmentary top view of the hauler illustrating the winch assembly and the basket lock mechanism in the unlocked position, wherein the basket is free to rotate.

The basket 16 rotates (e.g., manually or by gravity as the frame 14 pivots) relative to the frame 14 about the axis defined by the hubs 178,180. The basket 16 can be maintained in various positions of rotation relative to the frame 14. Particularly, each of the hub plates 174,176 includes a plurality of basket positioning apertures 188,190, respectively. The positioning apertures 188,190 are matched so that each of the hub plates 174,176 has the same number of apertures and the apertures are coaxially aligned relative to the apertures of the opposing hub plate. The positioning apertures 188,190 each have a twin, concentric circle configuration around the hubs 178,180 on the respective hub plate 174,176. Spring-loaded basket positioning pins (only the positioning pin 192 on the gin pole 74 being shown) are coupled to a respective one of the basket-supporting sections 96,98 of the gin poles 72,74, and cooperate with the positioning apertures 188,190 to provide a mechanism for retaining the basket 16 at various—indexed—positions of rotation relative to the frame 14. Tile positioning pins are essentially identical and therefore only the positioning pin 192 will be described in detail. The positioning pin 192 is configured to fit in each of the plurality of apertures 190 and is spring biased toward a basket retention position, wherein the pin 192 is disposed within one of the apertures 190. The pin 192 includes a pin ring 194 coupled thereto so that the pin 192 can be manually pulled out of the basket retention position as shown in FIG. 4.

The basket positioning pin 192 is pivotally mounted to the gin pole 74. Particularly, the pin 192 rides in a pin flange 196 that is fixed to a pivot bar 198 (see FIG. 4). The pivot bar 198 is generally rectangular in shape and extends from the pin flange 196 on the top surface of the gin pole 74 spanning the entire width of the gin pole 74 so as to project beyond the bottom surface of the gin pole 74. The flange end of the pivot bar 198 is configured with a corresponding aperture so that the pin 192 can protrude through the aperture in the pivot bar 198 and engage with the positioning apertures 190. Fixed to the pivot bar 198 opposite its Range end, is a pivot pin assembly 200. The pivot pin assembly 200 includes a pivot pin extending outward from the pivot bar 198 in a direction generally parallel with the positioning pin 192. The pivot pin rotatably rides in a pivot flange 202 fixed to the bottom surface of the gin pole 74 generally opposite from and parallel to the pin flange 196. The pivot pin assembly includes a cotter pin that secures the pivot pin in the pivot flange 202.

When the pin 192 is in the basket retention position it will be disposed within an individual aperture lying on one of the concentric circles of the plurality of apertures 190. When the pin 192 is pulled out of the basket retention position, and the basket 16 is manually rotated to the next indexed position of rotation, the pin 192 is manually pivoted about the pivot pin of the assembly 200 until the pin 192 aligns with the next aperture on the adjacent concentric circle (nearest the aperture the pin 192 was previously removed from on the other concentric circle) of apertures 190. Each concentric circle of apertures contains twenty apertures resulting in forty total apertures 190—or indexes—on the hub plate 176. The basket 16 can rotate 360 degrees about the axis defined by the hubs 178,180; therefore, each index generally corresponds to nine degrees of rotation of the basket 16 relative to the frame 14. The positioning pin pivotally mounted on the gin pole 72 is essentially identically constructed and configured as previously described with respect to the positioning pin 192 and therefore operates in a similar manner in sync with the operation of the positioning pin 192.

It is within the ambit of the present invention to utilize various alternative basket configurations and means for selectively rotating the basket 16. For example, the indexed positions of rotation could be defined by variously arranged apertures (e.g., aperture designs other than twin concentric circles and having other than forty indexed positions). The basket could include a motor for automatically rotating the basket and the positioning pins could be electronically operated for remote control of the basket.

The indexed positions of rotation cooperate with the pivoting positions of the frame 14 to provide the hauler 10 with numerous versatile uses. For example, the basket 16 can be rotated to an open-throat position as shown in FIG. 6 to facilitate its loading or unloading. The basket 16 can be rotated between various positions to achieve a dumping effect (e.g., loading the basket 16 in an upright position, pivoting the frame 14 up to the transport position and then rotating the basket 16 180 degrees to dump its contents into the rear compartment of a vehicle). The basket 16 could be rotated into the open-throat position with the frame 14 in the transport position and utilized as a kennel carrier.

Operation

In operation, the hauler 10 is first mounted to the receiver hitch H of a passenger vehicle V. The hitch member 24 of the base 12 is inserted into the receiver hitch H and secured with the receiver hitch retention pin. The horizontal support member 18 of the base 12 is mounted to the receiver tubes 30,32 by securing the U-bolts 38,40 into the receiver tube supports 34,36. To facilitate mounting the base 12 to the hitch H, the basket 16 can be easily removed from the frame 14 while the hauler 10 rests on the ground by removing the hub lock pins. In addition, the extension sections 100,102 of the gin poles 72,74 can be removed by removing the gin pole locking pins 104,106 and sliding the sections 100,102 out of the basket-supporting sections 96,98. The frame 14 can be left in the loading position during mounting of the base 12 so that it is supported on the ground, rather than the base 12.

Once the base 12 is mounted on the hitch H, the basket 16 is attached by cranking the handle 38 in the cable coiling direction to pivot the frame 14 sufficiently toward the transport position so that the hub brackets engage the hubs 178,180 of the basket 16. The hub lock pins are then inserted into the hub brackets to secure the basket 16 to the frame 14. With the frame 14 in the loading position (and the basket 16 resting on the ground surface and having the platform 172 inserted into the basket 16 so that it is supported by the platform supports 168,170) the basket 16 is ready to be loaded with cargo.

The hauler 10 can accommodate a variety of cargo-loading demands with its versatile loading features. The frame 14 can be pivoted further towards the transport position by cranking the handle 38 in the cable coiling direction until the desired pivot position index is achieved (e.g., raising the basket 16 sufficiently above the ground surface to allow the basket 16 to be rotated). The basket 16 can then be rotated to the desired rotational position (e.g., the open-throat position) by pulling the pin rings to release the basket positioning pins. The basket 16 is then manually rotated to the desired position and the pin rings are released allowing the spring-loaded positioning pins to engage the corresponding index apertures of the positioning apertures 188,190 (the positioning pins may have to be pivoted about the pivot pins if the desired apertures lye along the adjacent concentric circle relative to the previous rotational position of the basket 16).

If it is undesirable to manually load the cargo (e.g., a heavy or bloody deer carcass), the basket 16 can be positioned in the open-throat position and the frame 14 can be pivoted to the loading position (this configuration is shown in FIG. 6). In this position, the platform 172 can be removed from the basket 16 and the winch assembly 122 can be configured to winch the cargo into the basket 16. The first and second snatch blocks 150,152 are attached to the hauler 10 as illustrated in FIG. 6 and the cable 126 is disconnected from the double clevis hook 148, unthreaded from the pulley assemblies 128,130,132 and threaded through the snatch blocks 150,152. The cable 126 is then attached to the clevis slip hook 156, threaded through the basket 16 and then attached to the cargo. The handle 138 is cranked in the cable coiling direction to winch the cargo into the basket 16. The previous steps are then reversed to return the hauler 10 to its standard operating configuration and the basket 16 is rotated back to its upright position.

Once the hauler 10 is loaded, it can be pivoted to and secured in a transport position. With the basket 16 loaded with cargo, the handle 138 is cranked in the cable coiling direction to pivot the frame 14 to the transport position. The frame locking pins 90,92 are then inserted into the aperture sets 86,88 of the bracket assemblies 42,44 (the pins 90,92 pass through the apertures in the blocks 82,84) to lock the frame 14 in the transport position. The hauler 10 is now sufficiently stowed for secure transporting of the cargo load.

The hauler 10 has several versatile features in addition to its hauling features. The hauler 10 can be used as a loader (e.g., to load heavy cargo into the bed of pickup truck). The cargo is loaded into the basket 16 with the frame 14 in its loading position (or in a position intermediate to the loading and transport positions). The frame 14 is then pivoted sufficiently towards the transport position so that the basket 16 is adjacent the tailgate T of the vehicle V. The basket 16 is then rotated to the desired rotational index (e.g., with the open-throat of the basket 16 open to the bed of the vehicle V), and the cargo is removed from the basket 16 into the bed of the vehicle V.

The hauler 10 can also be used as a hoist (e.g., to hoist a deer carcass above the ground surface for skinning). The frame 14 is pivoted to the loading position and the basket 16 can be detached by removing the hub locking pins. The extension sections 100,102 are extended into the extended position and retained there by gin pole locking pins 104,106. The cross bar 110 is mounted to the end portions 100a,102a. The first and second snatch blocks 150,152 are coupled to the hauler 10 as illustrated in FIG. 7. The cable 126 is disconnected from the double clevis hook 148, unthreaded from the bottom pulleys of the assemblies 128,130, then threaded through the first and second snatch blocks 150,152 and attached to the clevis slip hook 156. The clevis slip hook 156 (and thus the cable 126) is threaded under the gin pole 74 and temporarily attached thereto (e.g., hooked to the gin pole locking pin 106) while the handle 138 is cranked in the cable coiling direction to pivot the frame 14 into the transport position where it is locked by the frame locking pins 90,92. The clevis slip hook 156 is then unhooked from the gin pole 74 and the handle 138 is cranked in the cable uncoiling direction until the clevis slip hook 156 is adjacent (or resting on) the ground surface. The clevis slip hook 156 is attached to the gambrel 158, which is then attached to the cargo. The handle 138 is cranked in the cable coiling direction to hoist the cargo to the desired height. These steps are reversed to return the hauler 10 to its standard operational configuration.

The hauler 10 can further be used as a workstation (e.g., to cut up and section out the meat of a deer carcass). The platform 172 is removed from the basket 16, the basket 16 is rotated so that the throat of the basket 16 is directed towards the ground surface and the frame 14 is pivoted to the loading position so that the top ring 160 of the basket 16 rests on the ground surface. The platform 172 is then secured in the lip formed in bottom ring 164. The height of the workstation feature can be adjusted by pivoting the frame 14 to the desired height and rotating the basket 16 if necessary (e.g., to achieve a level work surface). When the hauler 10 is in the workstation configuration, the basket 16 can be removed to facilitate various workstation uses (e.g., a shooting stand).

The hauler 10 is easily detachable from the hitch H for storage when not in use, or for access to the rear compartment of the vehicle V. However, access to the rear compartment of the vehicle V (e.g., through the tailgate T) can also be obtained while the hauler 10 is mounted on the hitch H. The frame 14 is pivoted to the loading position. The base locking pins 62,64 are removed and the lift towers 20,22 are pivoted to the rear-access position as illustrated in FIG. 8 providing access to the tailgate T of the vehicle V.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A hitch-mounted hauler for hauling cargo behind a vehicle, the hauler comprising:
   a base operable to mount on a hitch;
   a frame pivotally supported on the base; and
   a basket rotatably supported on the frame and being operable to haul cargo,
   said frame being pivotable between a loading position, wherein the basket is adjacent the ground and a transport position, wherein the basket is spaced from the ground and adjacent the rear of the vehicle.

2. The hauler as claimed in claim 1 further comprising:
   a winch assembly coupled with the base and the frame and operable to pivot the frame relative to the base between said loading and transport positions.

3. The hauler as claimed in claim 2,
   said winch assembly operable to indexically pivot the frame relative to the base between the loading and transport positions and selectively maintain the frame at each index,
   said indexes defining positions of the frame relative to the base intermediate to said loading and transport positions.

4. The hauler as claimed in claim 3,
   said winch assembly further operable to—hoist cargo relative to the frame, winch cargo into the basket, and couple to and uncouple from hoisting and winching implements.

5. The hauler as claimed in claim 1,
   said base having at least a portion thereof pivotable into and out of a rear-access position, wherein access to the rear of the vehicle is unobstructed by the base.

6. The hauler as claimed in claim 5,
   said base including a base-locking mechanism operable to selectively prevent the base from pivoting into the rear-access position.

7. The hauler as claimed in claim 1, said frame including a frame-locking mechanism operable to selectively prevent the frame from pivoting out of the transport position.

8. The hauler as claimed in claim 7, said frame including a pair of gin poles operable to rotatably support the basket, each of said gin poles having a basket-supporting section and an extension section telescopically received within the basket-supporting section and operable to telescope into and out of an extended position, wherein the extension section is substantially telescoped out of the basket-supporting section.

9. The hauler as claimed in claim 8, said frame further including a gin pole-locking mechanism operable to selectively prevent the gin poles from telescoping into the extended position and further operable to selectively lock the gin poles in the extended position.

10. The hauler as claimed in claim 9, said extension sections of the gin poles including distal ends operable to detachably receive hoisting implements.

11. The hauler as claimed in claim 1, said basket operable to indexically rotate relative to the frame and cooperate with the frame to selectively maintain the basket at each index, said indexes defining positions of rotation of the basket relative to the frame between 0 degrees of rotation, wherein the basket is perpendicular to the frame and substantially 360 degrees of rotation, wherein the basket has rotated substantially back to perpendicular to the frame.

12. A hitch-mounted hauler for hauling cargo behind a vehicle that travels along a ground surface, the hauler comprising:

a base operable to mount on a hitch; and a basket rotatably supported on the base and being operable to haul cargo, said basket being operable to rotate about a horizontal axis relative to the vehicle, said basket having a top and a bottom and defining a vertical axis therebetween relative to the vehicle, said basket operable to rotate substantially 360 degrees relative to the base, said basket including a locking mechanism operable to selectively lock the basket at a plurality of positions of rotation between 0 degrees of rotation relative to the base, wherein the vertical axis of the basket is generally parallel relative to the vehicle and the bottom of the basket is adjacent the ground surface, and 180 degrees of rotation relative to the base, wherein the vertical axis of the basket is generally parallel relative to the vehicle and the top of the basket is adjacent the ground surface.

13. The hauler as claimed in claim 12, said locking mechanism being yieldably biased into a locking position, wherein the basket is prevented from rotating out of any of said plurality of positions of rotation.

14. The hauler as claimed in claim 13, said basket including a removable platform operable to fit within the basket and operable to be supported by the bottom of the basket.

15. The hauler as claimed in claim 14, said basket being detachably and rotatably supported on the base.

16. A hitch-mounted hauler for hauling cargo behind a vehicle, the hauler comprising:

a base operable to mount on a hitch;

a basket rotatably supported on the base and being operable to haul cargo; and a winch assembly coupled to the base and being operable to hoist cargo relative to the basket, winch cargo into the basket, and couple to and uncouple from hoisting and winching implements.

17. The hauler as claimed in claim 16, said base including a cross bar detachably mounted thereto, said winch assembly being operable to be removably coupled to said cross bar and hoist cargo relative thereto.

18. The hauler as claimed in claim 17, said basket having a top and a bottom and defining a vertical axis therebetween relative to the vehicle, at least a portion of said base being slidable relative to the basket into an extended position, wherein said at least a portion of the base is above the top and the bottom of the basket relative to the vertical axis, said at least a portion of the base being operable to removably receive the cross bar.

* * * * *